(12) United States Patent
Okada

(10) Patent No.: US 6,829,625 B2
(45) Date of Patent: Dec. 7, 2004

(54) CORRELATION VALUE CALCULATING DEVICE

(75) Inventor: Atsuhiko Okada, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 786 days.

(21) Appl. No.: 09/798,916

(22) Filed: Mar. 6, 2001

(65) Prior Publication Data

US 2002/0065858 A1 May 30, 2002

(30) Foreign Application Priority Data

Oct. 23, 2000 (JP) ........................................ 2000-322205

(51) Int. Cl.⁷ .............................. G06J 1/00; G06F 17/15
(52) U.S. Cl. .......................................................... 708/5
(58) Field of Search .............................. 708/5, 422–423

(56) References Cited

U.S. PATENT DOCUMENTS 3,830,965 A * 8/1974 Beaudette ................... 382/245
5,784,017 A * 7/1998 Craven ........................ 341/126

OTHER PUBLICATIONS

T. Shibata et al., "Advances in Neuron–MOS Application" ISSCC Digest of Technical Papers, pp. 304–305, Feb. 10, 1996.

T. Ohmi et al., "Association Hardware for Intelligent Electric Systems" Papers of the Institute, Information and Communication Engineers, D–I vol. 1 J81–D–I No. 2, pp. 51–61, Feb. 1998.

M. Konda et al., "Memory–Merged Matching Cell" Proceedings of the 6$^{th}$ International Conference on Microelectronics for Neutral Networks, Evolutionary & Fuzzy Systems (MicroNeuro '97), pp. 175–180, Sep. 1997.

A. Okada et al., "A Neuron–MOS Parallel Associator for High Speed CDMA Matched Filter", 1999 IEEE International Symposium on Circuit and Systems (ISCAS 99).

* cited by examiner

*Primary Examiner*—Tan V. Mai
(74) *Attorney, Agent, or Firm*—Volentine Francos & Whitt, PLLC

(57) ABSTRACT

A correlation value calculating device which has a small scale of circuitry, and allows template vectors to be rewritten. One template vector is written to one row of DRAM memory cells. One memory cell pair is used for storing one template vector component. A high-level is written to one memory cell and a low-level is written to the other memory cell according to the value of the template vector component. When calculating a correlation value, one memory cell of each memory cell pair is respectively connected to corresponding bit line according to the corresponding input vector component. If the components of both vectors are matched, the memory cell of the high-level is connected to the bit line, and if both vectors are not matched, the memory cell of the low-level is connected to the bit line. The electric potential of bit lines each become to indicate the correlation value.

20 Claims, 11 Drawing Sheets

CORRELATION VALUE CALCULATING DEVICE

BACKGROUND OF THE INVENTION

1. Field of the Invention

The present invention relates to a device for calculating the correlation value of compared vectors. The correlation value calculating device according to the present invention is used, for example, in a CDMA communications system.

2. Description of Related Art

A correlation value calculating device is a device for calculating the correlation value of compared vectors. These vectors are respectively constituted by a plurality of components. The correlation value calculating device respectively calculates the absolute values of the differences between corresponding components of the vectors. The correlation value calculating device then calculates the sum of these absolute values. This sum is the correlation value.

Previously known correlation value calculating devices include those disclosed in the following references, for example.

Reference I : T. Shibata et. al., "Advances in Neuron-MOS Application", ISSCC Digest of Technical Papers, pp. 304–305, Feb. 10, 1996

Reference II : T. Ohmi et. al., "Association Hardware for Intelligent Electric Systems", Papers of The Institute of Electronics, Information and Communication Engineers, D-I Vol. J81-D-I No.2, pp. 51–61, February 1998

Reference III: M. Konda et. al., "Memory-Merged Matching Cell", Proceedings of the $6^{th}$ International Conference on Microelectronics for Neural Networks, Evolutionary & Fuzzy Systems (MicroNeuro '97), pp. 175–180, September, 1997

Reference IV: A. Okada et. al., "A NEURON-MOS Parallel ASSOCIATOR FOR HIGH SPEED CDMA MATCHED FILTER", 1999 IEEE International Symposium on Circuit and Systems (ISCAS 99)

The correlation value calculating devices in references I–III respectively compare one input vector with a plurality of template vectors, in a simultaneous fashion. These correlation value calculating devices comprise a plurality of calculator devices, called "associators", and a single large-capacity memory. Firstly, a plurality of template vectors stored in the large-capacity memory are downloaded into the associators. Each component of the respective template vectors is stored respectively in a single corresponding associator. Thereupon, the correlation value calculating devices receive an input vector. The various components of the input vector are input to the corresponding plurality of associators. Each associator calculates the absolute value of the difference between the two components input thereto. The sum of these absolute values is calculated for each template vector, and then output from the correlation value calculating device.

The correlation value calculating devices in references I–III are provided with a number of associators corresponding to the number of components, in other words, the number of dimensions, of each template vector. Each associator respectively comprises 13 transistors. Therefore, if the number of template vectors is high, and the number of dimensions of the template vectors is high, then the circuitry of the correlation value calculating devices will become very large in scale. Furthermore, in the correlation value calculating devices in references I–III, it is necessary to provide wiring from the large-capacity memory to the associators, in order to download the template vectors. This wiring also causes the circuitry of the correlation value calculating devices to increase in size. In addition, if the number of template vectors is high and the number of template vector dimensions is high, then the time required for downloading will be long, and hence processing time will also be long.

The correlation value calculating device according to reference IV comprises associators wherein the components of the template vectors are stored previously. Therefore, this type of correlation value calculating device does not require a large-scale memory or wiring for download purposes. Furthermore, the associators in this correlation value calculating device only have two transistors. Therefore, the scale of the circuitry in this correlation value calculating device is small. However, with this correlation value calculating device, it is difficult to rewrite the template vectors.

SUMMARY OF THE INVENTION

It is an object of the present invention to provide a correlation value calculating device having circuitry of a small scale, which enables rewriting of template vectors.

Therefore, the correlation value calculating device relating to the present invention comprises: one or a plurality of bit lines; a plurality of word lines disposed in such a manner that they intersect with the bit lines; a plurality of memory cells disposed at the intersection points of the bit lines and the word lines, respectively comprising a capacitor for storing a binary value according to the terminal-to-terminal voltage thereof, and a transistor for controlling connection and disconnection between one terminal of the capacitor and the bit line, in accordance with the electric potential of the word line; a word line driver for inputting an input vector component to each word line pair constituted by two adjacently positioned word lines, applying a high-level electric potential to the one word line and applying a low-level electric potential to the other word line, if the component is a first value, or applying a low-level electric potential to the one word line and applying a high-level electric potential to the other word line, if the component is a second value; and a sense amplifier for amplifying and outputting the electric potential of the bit lines.

The correlation value calculating device relating to the present invention has a simple composition of memory cells. Furthermore, the correlation value calculating device relating to the present invention writes values to capacitor, and hence rewriting can be performed readily.

BRIEF DESCRIPTION OF THE DRAWINGS

Other objects and merits of the present invention are described with reference to the accompanying drawings, wherein.

DESCRIPTION OF THE PREFERRED EMBODIMENTS

Figure 1:
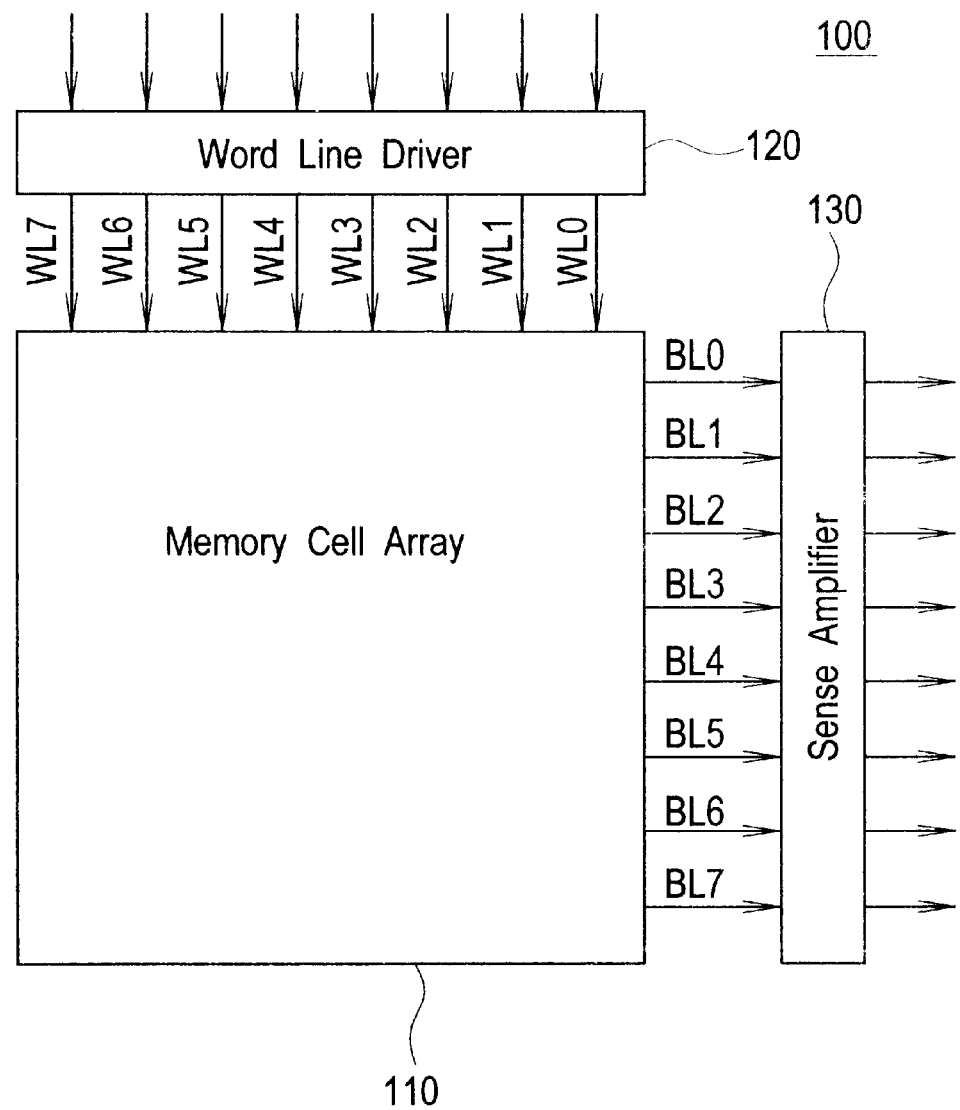
FIG. 1 is a block diagram giving an approximate illustration of the composition of a correlation value calculating device relating to the present invention.

Below, embodiments of the present invention are described with reference to the drawings. In the drawings, the size, shape and configurational relationships of the respective components are illustrated only in an approximate fashion, for the purpose of understanding the present invention. Furthermore, the numerical conditions described in the following are simply examples of same.

First Embodiment

A correlation value calculating device according to the first embodiment of the present invention is now described with reference to FIG. 1 to FIG. 4. This embodiment is described using the example of a device which calculates correlation values for vectors having four components. The device relating to this embodiment simultaneously compares a single input vector with 8 template vectors.

FIG. 1 is a block diagram showing the composition of a correlation value calculating device relating to the present embodiment.

As illustrated in FIG. 1, the correlation value calculating device 100 relating to this embodiment comprises a memory cell array 110, word line driver 120, sense amplifier 130, word lines WL0–WL7 and bit lines BL0–BL7.

The memory cell array 110 comprises a DRAM (Dynamic Random Access Memory). As described hereinafter, this memory cell array 110 comprises a plurality of memory cells disposed in a matrix fashion (see FIG. 2).

The word line driver 120 is connected via the eight word lines WL0–WL7, to the memory cell array 110. The word line driver 120 activates the word lines WL0–WL7 corresponding to the value of an input vector supplied from an external source. The word line driver 120 is constituted in such a manner that it is capable of activating a plurality of word lines simultaneously. As described hereinafter, a single vector component, is expressed by two binary data. Therefore, one vector component is transmitted to the memory cell array 110 by means of two word lines.

The sense amplifier 130 is connected to the memory cell array 110 by means of the bit lines BL0–BL7. This sense amplifier 130 amplifies the analogue electric potential of the bit lines BL0–BL7. As described hereinafter, the electric potential of each bit line BL0–BL7 respectively indicates a single correlation value. In other words, the sense amplifier 130 externally outputs eight correlation values simultaneously as a correlation value group.

Figure 2:
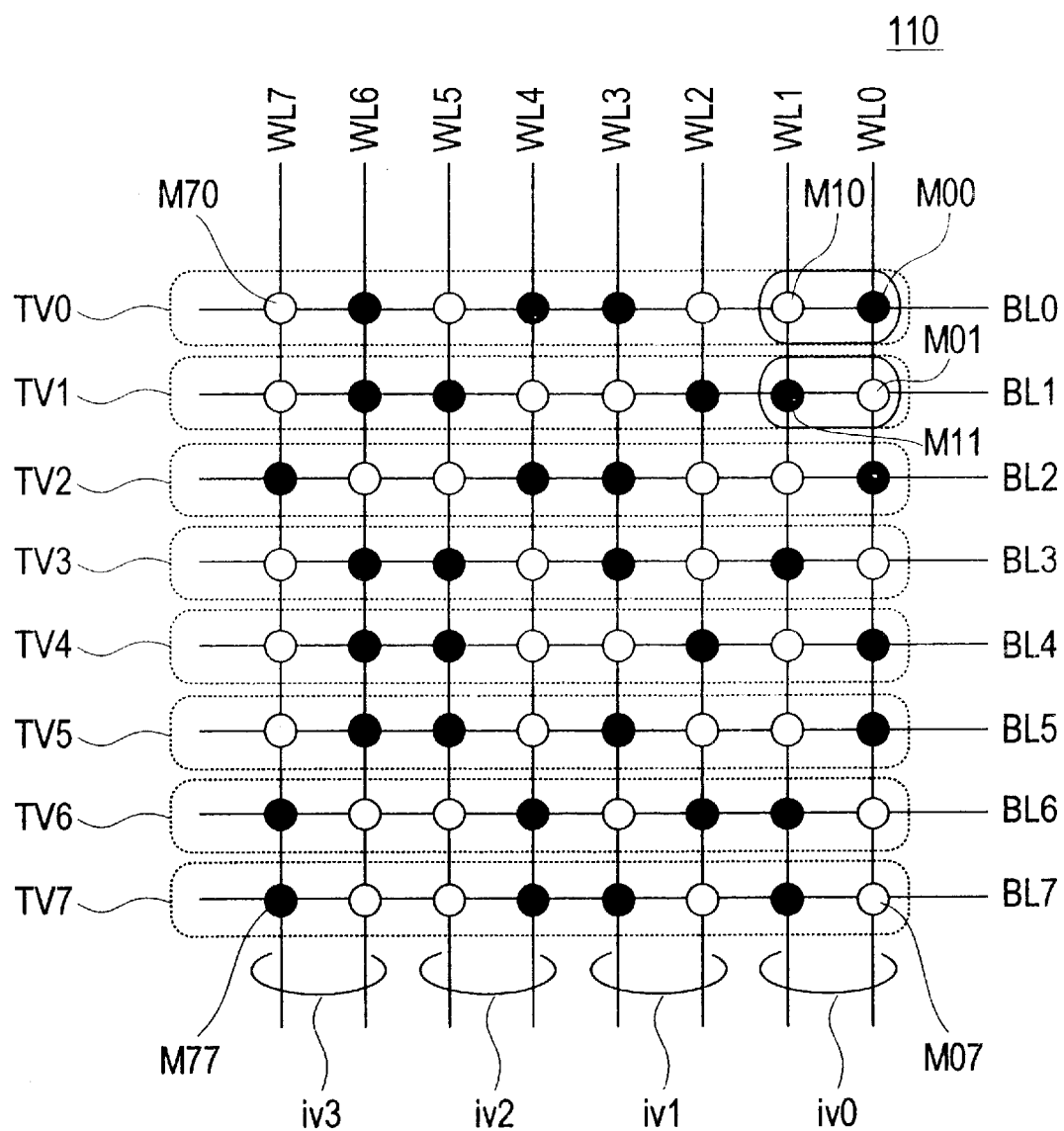
FIG. 2 is a conceptual diagram showing the internal structure of a memory cell array provided in a correlation value calculating device relating to a first embodiment.

FIG. 2 is a diagram of a memory composition example illustrating the internal construction of a memory cell array 110. In the example in FIG. 2, the memory cell array 110 comprises an array of 8×8 memory cells M00–M77.

As shown in FIG. 2, one memory cell is disposed respectively at each intersection point of the word lines WL0–WL7 and the bit lines BL0–BL7. One row of memory cells, in other words, the eight memory cells connected to the same bit line, are used to store a single template vector. In the example in FIG. 2, the template vectors TV0–TV7 are stored in bit lines BL0–BL7.

Each template vector TV0–TV7 is constituted respectively by four vector components. The value of each vector component may be either '+1' or '−1'. Each vector component is stored by means of a pair of memory cells positioned adjacently on the same bit line. For example, the last vector component of the template TV0 is stored by means of the memory cell pair M00, M10, whilst the last vector component of the template TV1 is stored by the memory cell pair M01, M11.

In each memory cell pair, an electric potential Vdd is written to one of the memory cells, whilst the electric potential Vss is written to the other memory cell. In FIG. 2, the black circles indicate memory cells to which the electric potential Vdd has been written, and the white circles indicates memory cells to which the electric potential Vss has been written. If the value of the vector component is '−1', then the electric potential Vdd is written to the left-hand side memory cell of the memory cell pair, in other words, to the memory cell connected to word line WL1, WL3, WL5 or WL7, and the electric potential Vss is written to the right-hand side memory cell of the memory cell pair, in other words, to the memory cell connected to word line WL0, WL2, WL4 or WL6. Furthermore, if the value of the vector component is '+1', then the electric potential Vdd is written to the right-hand side memory cell and the electric potential Vss is written to the left-hand side memory cell. In the example in FIG. 2, of the vector components of the template vector TV0, for example, the values of the vector components corresponding to the word lines WL0, WL1 is '+1', the value of the vector components corresponding to the word lines WL2 and WL3 is '−1', the value of the vector components corresponding to the word lines WL4 and WL5 is '+1', and the value of the vector components corresponding to the word lines WL6 and WL7 is '+1'. Therefore, the template vector TV0 is (1, 1, −1, 1). Similarly, the template vector TV1 is (1, −1, 1, −1).

Additionally, the memory cells M00–M77 are supplied respectively with the input vector. An input vector IV comprises four vector components iv0, iv1, iv2 and iv3. Each vector component may have the value '+1' or '−1'. The input vector components iv0, iv1, iv2, iv3 are supplied respectively to the memory cells pairs storing the corresponding template vector component. For example, the vector component iv0 is supplied to the memory cells pairs connected to word lines WL0 and WL1, in other words, the pair, M00, M10, the pair M01, M11, and so on. At each memory cell pair, if the vector components has a value of '−1', then a high-level electric potential is applied to the left-hand side memory cells of the memory cell pairs, in other words, the memory cells connected to the word lines WL1, WL3, WL5 or WL7, and a low-level electric potential is applied to the right-hand side memory cells of the memory cell pairs, in other words, the memory cells connected to the word lines WL0, WL2, WL4 or WL6. If, on the other hand, the vector component has the value '+1', then a high-level electric potential is applied to the right-hand side memory cells of the memory cell pairs, and a low-level electric potential is applied to the left-hand side memory cells of the memory cell pairs.

Figure 3:
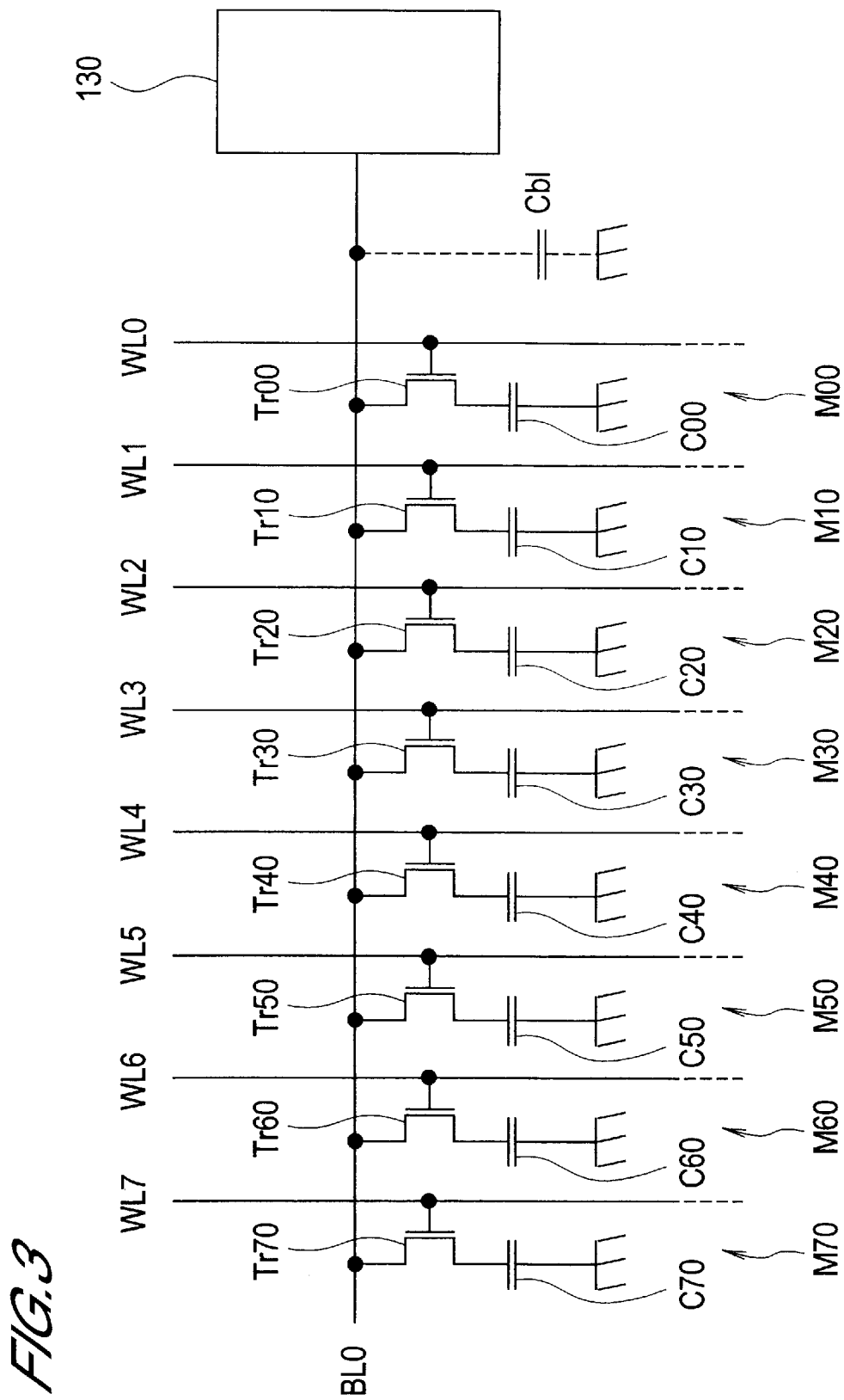
FIG. 3 is a circuit diagram giving a partial illustration of the internal structure of a memory cell array provided in a correlation value calculating device relating to a first embodiment.

FIG. 3 is a circuit diagram showing an example of the specific composition of a memory cell array 110. FIG. 3 shows only a composition example of memory cells M00–M70 connected to bit line BL0, but the memory cells connected to the other bit lines BL1–BL7 are constituted in a similar manner.

As shown in FIG. 3, the respective memory cells M00–M70 each comprise a single transistor and a single capacitor. Cbl in FIG. 3 is a conceptual depiction of a parasitic capacitance of bit line BL0. The gates of transistors Tr00–Tr70 are connected to the corresponding word lines WL0–WL7. The sources of transistors Tr00–Tr70 are respectively connected to the bit line BL0. Moreover, the drain of each transistor is connected respectively to one terminal of a corresponding capacitor C00–C70. The other terminal of each capacitor C00–C70 is connected to earth. The capacitors C00–C70 are used to store the components of the template vector. In other words, the electric potential Vdd or electric potential Vss is written to the capacitors C00–C70. The transistors Tr00–Tr70 are switches for switching the capacitors C00–C70 and bit line BL0 on and off.

Below, the operational principles of the correlation value calculating device relating to the present embodiment are described.

The method for writing template vector components to the memory cells M00–M70, is similar to that used in a standard DRAM. In other words, when writing vector components, a high-level electric potential is applied to a desired word line whilst the electric potential Vdd or electric potential Vss is applied to the bit line BL0. Thereby, the electric potential Vdd or electric potential Vss is written to the capacitor corresponding to the selected word line. As described above, in this embodiment, the values of the template vector corresponding to the bit line BL0, in other words, the template vector TV0, is (1, 1, −1, 1). Therefore, the electric potential Vdd is written to the capacitor C00, C30, C40, C60, and the electric potential Vss is written to the capacitor C10, C20, C50, C70.

When calculating the correlation value of the template vector TV0 and the input vector IV, firstly, the electric potential of the bit line BL0 is set to the electric potential Vdd/2, by pre-charging the bit line BL0. Thereupon, the word lines WL0–WL7 are activated in accordance with the values of the input vector IV. Thereby, a high-level or low-level electric potential is applied to the gate of the transistor Tr00–Tr70. If a high-level electric potential is applied to the gates, then the transistors Tr00–Tr70 are turned on, and if a low-level electric potential is applied to the gates, then the transistors are remained to be off. Accordingly, the capacitors C00–C70 are connected to the bit line BL0 if the electric potential of the corresponding word line is high-level, but if the electric potential of the corresponding word line is low-level, then they are not connected to the bit line BL0. As stated previously, if the value of the input vector component is '1', then of the two word lines corresponding to the memory cell pair, a high-level electric potential is applied to the right-hand word line, and a low-level electric potential is applied to the left-hand word line thereof. Therefore, if the value of the input vector component is '1', then only the right-hand side capacitors of the memory cell pair will be connected to the bit line BL0. If, on the other hand, the value of the input vector component is '−1', then only the left-hand side capacitors of the memory cell pairs are connected to the bit line BL0.

If the value of the template vector component is '1', then the storage electric potential of the capacitor of the right-hand side memory cell is Vdd, and the storage electric potential of the capacitor of the left-hand side memory cell is Vss. If, conversely, the value of the template vector component is '−1', then the storage electric potential of the capacitor of the right-hand memory cell is Vss, and the storage electric potential of the capacitor of the left-hand memory cell is Vdd. Therefore, if the value of the input vector component matches the value of the corresponding template vector component, then the capacitor storing the electric potential Vdd will be connected to the bit line BL0, and the capacitor storing the electric potential Vss will not be connected to the bit line BL0. If, conversely, the value of the input vector component does not match the value of the corresponding template vector component, then the capacitor storing the electric potential Vss will be connected to the bit line BL0, and the capacitor storing the electric potential Vdd will not be connected to the bit line BL0.

As stated above, at the start of calculation, the bit line BL0 is pre-charged in such a manner that the electric potential thereof is Vdd/2. Therefore, when the word line is activated corresponding to the value of the input vector, then in a memory cell pair where the input vector component and the template vector component are matching, an electric charge is supplied from the capacitor to which the electric potential Vdd is written, to the bit line BL0. In the same situation, in a memory cell pair where the input vector component and the template vector component are not matching, an electric charge is output from the bit line BL0 to the capacitor to which the electric potential Vss is written.

The total accumulated electric charge Qbl of the bit line BL0 and the total accumulated electric charge Qcell of the memory cells M00–M70, before the word lines are activated, is expressed by the equations (1) and (2). In equations (1) and (2), Cbl is the capacitance of the bit line, and Ccell is the capacitance of each capacitor C00–C70.

$$Qbl = Cbl\frac{Vdd}{2} \qquad (1)$$

$$Qcell = nCcellVdd + nCellVss \qquad (2)$$

When the word line is activated, a supply or output of electric charge occurs as described above, thereby causing the electric potential of the bit line BL0 to change. In the following description, the number of components in the input vector, and the number of components in the template vector is taken as n (in the example in FIG. 2 and FIG. 3, n=4). Accordingly, the number of memory cells is 2n. In each memory cell pair, the capacitor of one memory cell is connected to a bit line BL0, and the capacitor of the other memory cell is not connected to the bit line BL0. Therefore, the number of capacitors connected to the bit line BL0 is always n. Taking the number of matching vector components as k, then the number of memory cells which will supply an electric charge to the bit line BL0 is k, and the number of memory cells to which an electric charge will be output from the bit line BL0 is n−k. On the other hand, the number of capacitors not connected to the bit line BL0 will always be n. Of these capacitors, the number of capacitors storing the electric potential Vss will be k, and the number of capacitors storing the electric potential Vdd will be n–k. Therefore, the total accumulated electric charge Qbl' of the bit line BL0 and the total accumulated electric charge Qcell' of the memory cells M00–M70, after the word lines have been activated, is expressed by the equations (3) and (4), wherein V is the electric potential of the bit line BL0 after the word lines WL0–WL7 have been activated.

$$Qbl'=CblV \qquad (3)$$

$$Q'cell=kCcellV+(n-k)CcellV+kCcellVss+(n-k)CcellVdd \qquad (4)$$

From the law of conservation of electric charge, the following expression can be established: Qbl+Qcell=Qbl'+Qcell'. If the equations (1)–(4) above are introduced into this expressions, and if zero volts is introduced for Vss, then equation (5) is obtained.

$$V = \frac{Vdd}{2} + (2k-n)\frac{Ccell}{Cbl+nCcell}\frac{Vdd}{2} \qquad (5)$$

From equation (5), it can be seen that the larger the matching number k of the vector components, the greater the electric potential in the bit line BL0.

Looking only at the memory cells contributing to the movement of electric charge, this increase in the electric charge of the bit line BL0 can be interpreted as follows.

Namely, the amount of electric charge redistributed to the bit line BL0 from memory cells where there is a vector component match will be (+1)·Ccell·Vdd/2, and the electric charge redistributed to the bit line BL0 from memory cells where there is no vector component match will be (−1)·Ccell·Vdd/2. As described above, the accumulated electric charge of memory cells where there is a vector component match is Ccell·Vdd, and the accumulated electric charge of memory cells where there is no vector component match is Ccell·Vss=0 (because Vss=0). Therefore, it can be regarded that the amount of electric charge in the respective memory cells which does not contribute to redistribution will be Ccell·Vdd/2, regardless of whether or not the vector components are matching. Consequently, taking the number of matching vector components as k, the sum total of the redistributed electric charge in the memory cells which produce a vector component match will be k·Ccell·Vdd/2, the sum total of the redistributed electric charge in the memory cells which do not produce a vector component match will be (−1)·(n−k)·Ccell·Vdd/2, and the sum total of the electric charge which is not redistributed will be n·Ccell·Vdd/2. Therefore, the sum total of electric charge before redistribution will be given by equation (6).

$$Qall = Cbl\frac{Vdd}{2} + \left[nCcell\frac{Vdd}{2} + kCcell\frac{Vdd}{2} - (n-k)Ccell\frac{Vdd}{2}\right] \qquad (6)$$

By rearranging equation (6), the following expression (7) can be obtained. In equation (7), IV is the input vector and TV is the template vector. The respective components of IV and TV are +1 or −1.

$$Qall = (Cbl + Ccell)\frac{Vdd}{2} + \sum_{i}^{n}\left(Ccell\frac{Vd}{2}\right)IV[i]\cdot TV[i] \qquad (7)$$

Moreover, further rearrangement of equation (7) yields equation (8), wherein IV·TV is 2k-n.

$$Qcell = (Cbl + nCcell)\frac{Vdd}{2} + Ccell\frac{Vdd}{2IV}IV\cdot TV \qquad (8)$$

On the other hand, since the number of memory cells associated with the movement of electric charge is n, then the total electric charge after movement of electric charge will be given by equation (9).

$$Qall'=(Cbl+nCcell)V \qquad (9)$$

From the law of conservation of electric charge, Qall=Qall'. Substituting equation (8) and equation (9) into this expression yields the following equation (10).

$$V = \frac{Vdd}{2} + \frac{Ccell}{Cbl+nCcell}\frac{Vdd}{2}\overline{IV}\cdot\overline{TV} \qquad (10)$$

Equation (10) is the same as equation (5).

Equation (10) demonstrates that the correlation value calculating device according to the present embodiment is able to calculate a correlation value as the inner product of the input vector IV and the template vector TV.

Figure 4:
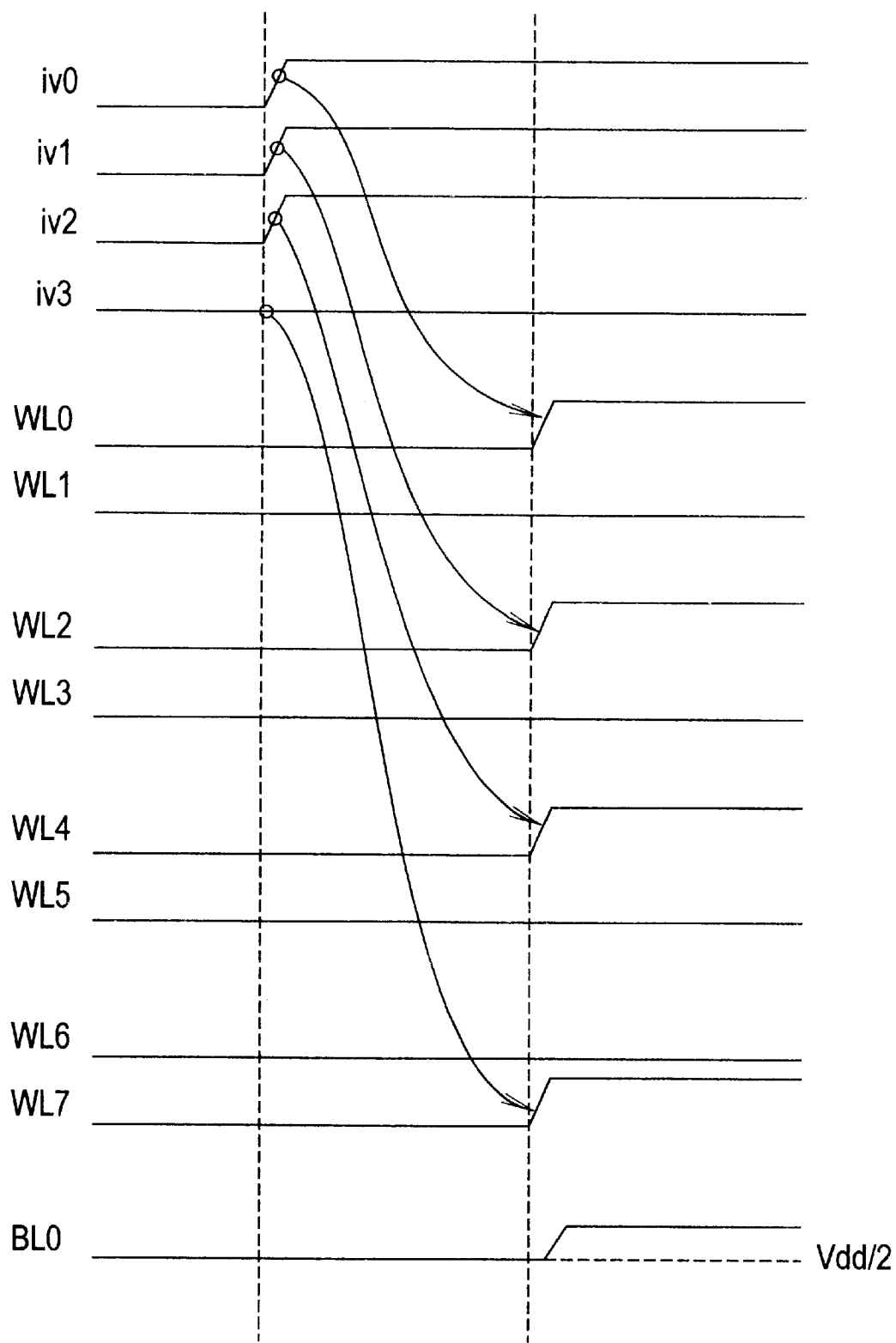
FIG. 4 is a timing chart for describing the operation of a correlation value calculating device relating to a first embodiment.

FIG. 4 is a timing chart illustrating the operational timing of a correlation value calculating device relating to the present embodiment.

Firstly, the respective components iv0–iv3 of the input vector IV are input to the word line driver 120 (see FIG. 1). The word line driver 120 decodes the value of each component iv0–iv3, and activates the word lines WL0–WL7 in accordance with the results of the decode operation.

Each memory cell M00–M77 either supplies electric charge to the bit line, or takes in electric charge from the bit line, as described above. Thereby, the electric potential of the bit lines BL0–BL7 are raised or drop from a voltage of Vdd/2.

Thereby, correlation values represented by equation (10) are output respectively from the bit lines BL0–BL7 to the sense amplifier 130.

As described in the foregoing, the correlation value calculating device relating to the present embodiment is capable of calculating correlation values for an input vector and template vectors, on bit lines BL0–BL7 of a DRAM.

The correlation value calculating device relating to the present embodiment uses two DRAM memory cells for each template vector component. In other words, in the present embodiment, the calculator corresponding to each single template vector component is constituted by two transistors and two capacitors. Furthermore, the correlation value calculating device relating to the present embodiment is also capable of storing one or a plurality of template vectors in a DRAM. Therefore, the correlation value calculating device relating to the present embodiment does not require a large-capacity memory for storing template vectors, and moreover, it does not require wiring for downloading template vectors. This means that the correlation value calculating device according to the present embodiment has circuitry which is very small in scale.

Since the correlation value calculating device according to the present embodiment uses a DRAM, it is easy to rewrite the template vectors.

Second Embodiment

Below, a correlation value calculating device relating to a second embodiment of the present invention will be described with reference to FIG. 5 to FIG. 7. The correlation value calculating device relating to the present embodiment is capable of refreshing the memory cell array, in other words, the DRAM, by using the sense amplifier.

Similarly to the first embodiment, the correlation value calculating device relating to the present embodiment comprises a memory cell array, a word line driver, a sense amplifier, word lines, and bit lines. However, the correlation value calculating device relating to the present embodiment comprises two bit lines for each single template vector.

Figure 5:
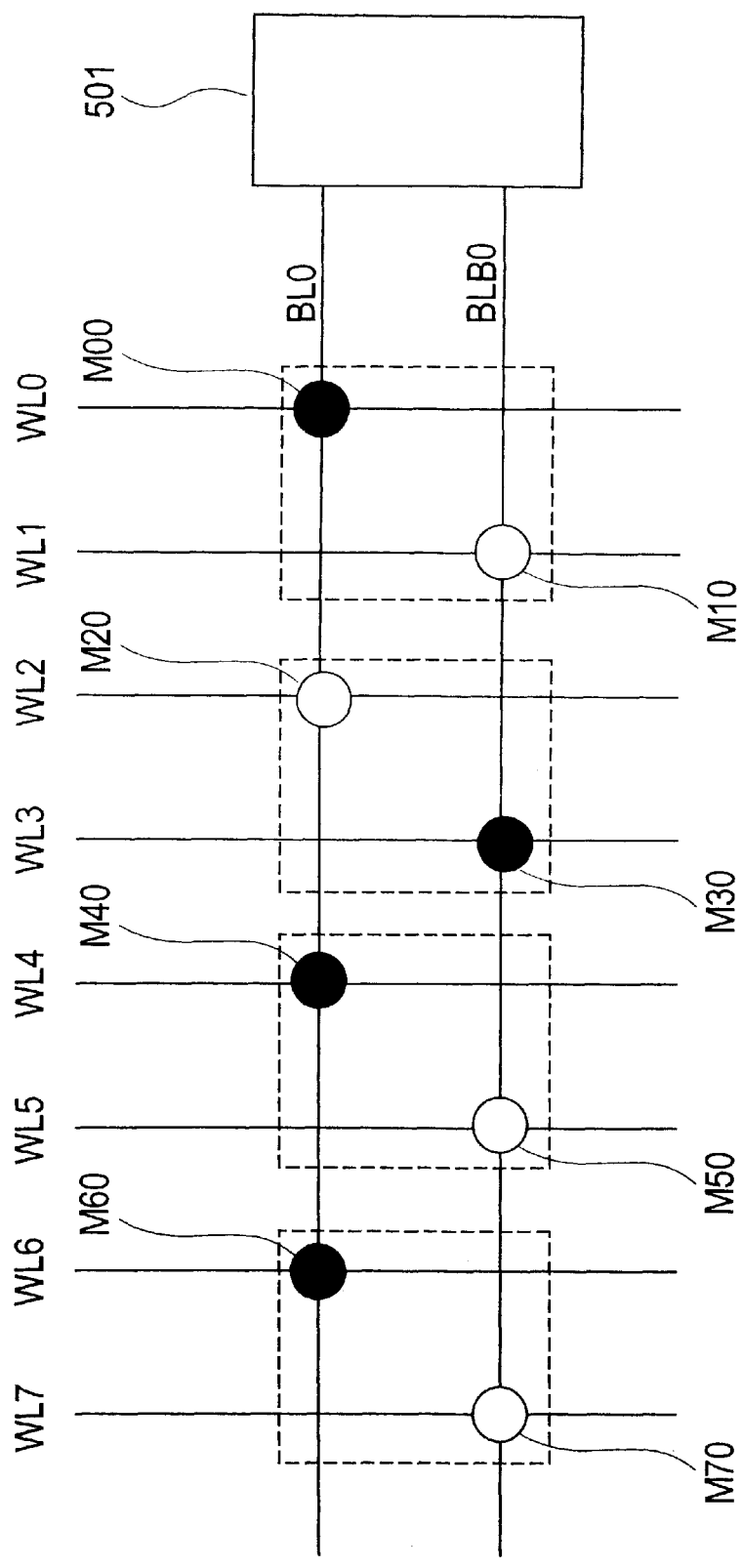
FIG. 5 is a conceptual diagram giving a partial illustration of the internal structure of a memory cell array provided in a correlation value calculating device relating to a second embodiment.

FIG. 5 is a conceptual diagram showing the principal composition of a correlation value calculating device relating to the present embodiment. FIG. 5 shows only the structure corresponding to one template vector TV0, but the structures corresponding to the other template vectors TV1–TV7 are similar to this.

As illustrated in FIG. 5, the correlation value calculating device relating to the present embodiment is provided with two bit lines BL0, BLB0 corresponding to a single template vector TV0. A memory cell is disposed at each intersection of the bit line BL0 and word lines WL0, WL2, WL4, WL6, and at each intersection of the bit line BLB0 and the word lines WL1, WL3, WL5, WL7. One row of memory cells, in other words, the eight memory cells connected to the bit line pair BL0 and BLB0, are used for storing one template vector.

The various vector components of the template vector TV0 are stored by means of a pair of adjacent memory cells. For example, the last vector component of the template vector TV0 is stored by the memory cell pair M00, M10. Similarly to the first embodiment, in each memory cell pair, the electric potential Vdd is written to one of the memory cells, and the electric potential Vss is written to the other of the memory cells. In FIG. 5, the black circles indicate memory cells to which the electric potential Vdd has been written, and the white circles indicate memory cells to which the electric potential Vss has been written. If the value of the vector component is '−1', then the electric potential Vdd is written to the left-hand side memory cell of the memory cell pair, in other words, the memory cells connected to the bit line BLB0, and the electric potential Vss is written to the right-hand side memory cell of the memory cell pair, in other words, to the memory cells connected to the bit line BL0. Moreover, if the value of the vector component is '+1', then the electric potential Vdd is written to the right-hand side memory cell and the electric potential Vss is written to the left-hand side memory cell.

Similarly to the first embodiment, each memory cell is supplied respectively with an input vector by means of the word lines. The input vector IV comprises four vector components iv0, iv1, iv2, iv3. The value of each vector component is '+1' or '−1'. The input vector components iv0, iv1, iv2, iv3 are respectively supplied to the memory cell pairs storing the corresponding template vector components. Similarly to the first embodiment, a word line driver (not illustrated) respectively applies a high-level or low-level to the word lines WL0–WL7, according to the value of the corresponding vector component.

The bit line pair BL0, BLB0 is connected to the sense amplifier 501. The sense amplifier 501 externally outputs a voltage corresponding to the accumulated electric charge of the bit line pair BL0, BLB0.

Figure 6:
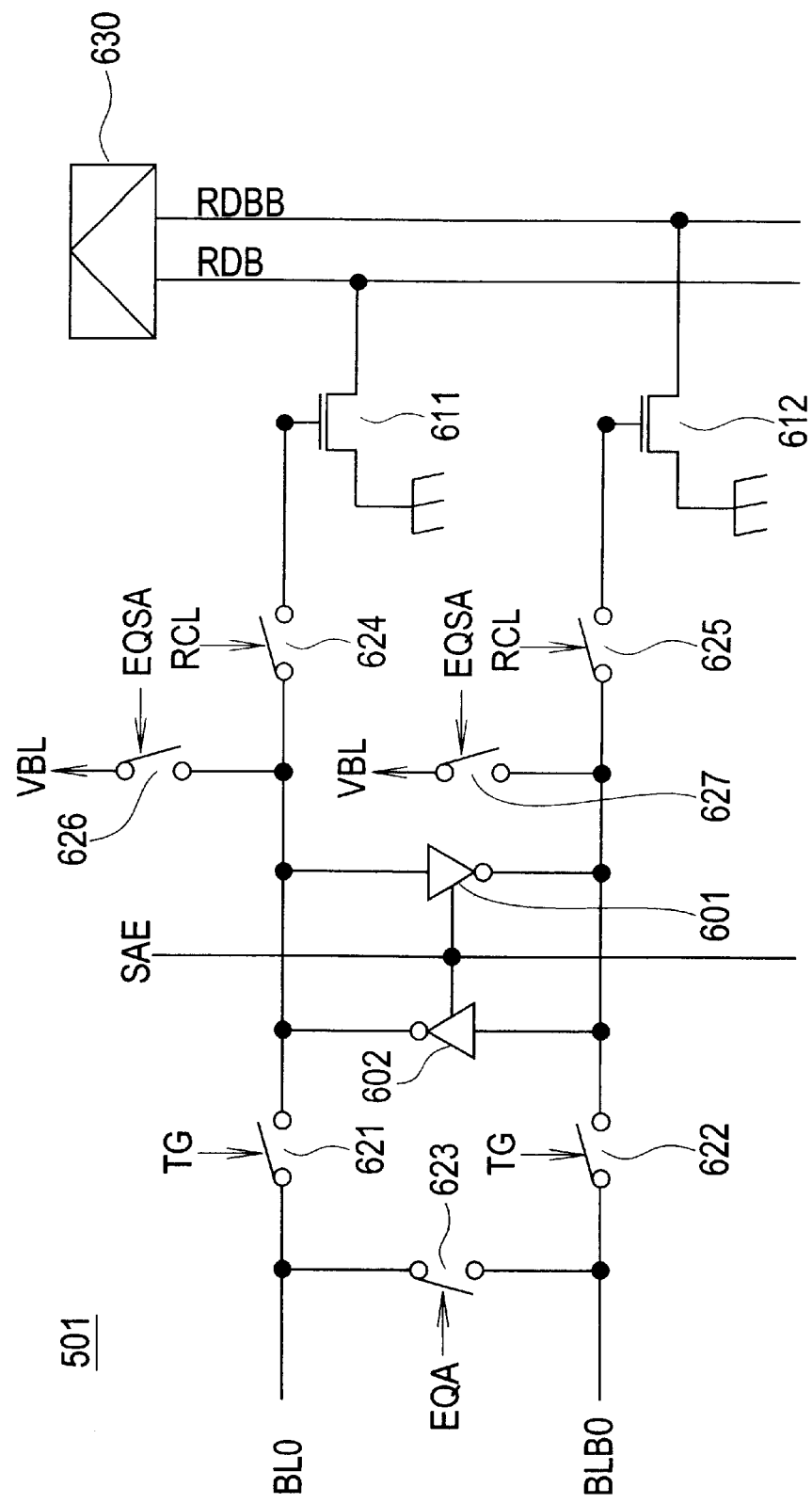
FIG. 6 is a circuit diagram showing the internal structure of a sense amplifier in FIG. 5.
Figure 7:
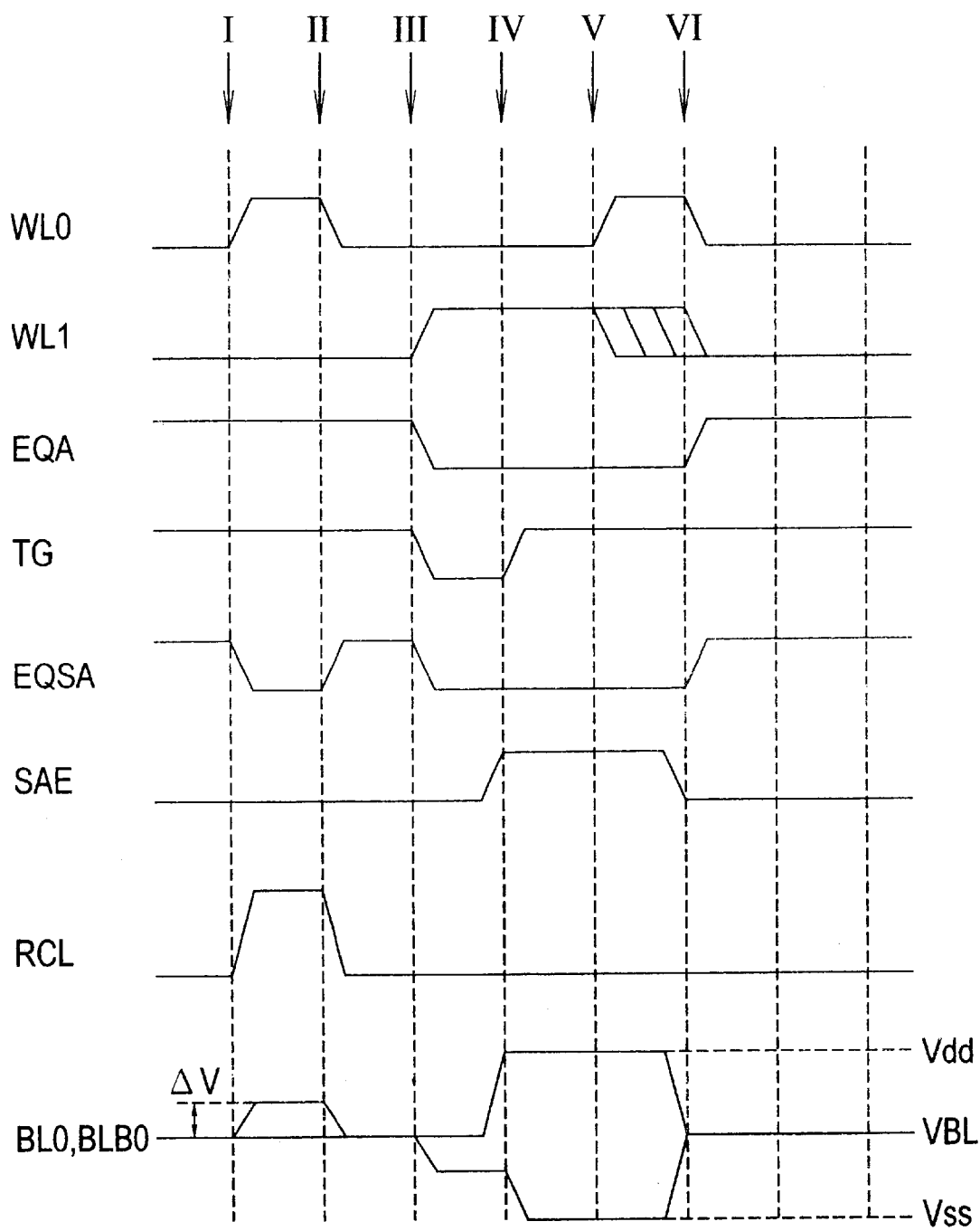
FIG. 7 is a timing chart for describing the operation of a correlation value calculating device relating to the second embodiment.

FIG. 6 is a circuit diagram showing an internal structural example of a sense amplifier 501.

As illustrated in FIG. 6, the sense amplifier 501 comprises inverters 601, 602, transistors 611, 612, switches 621–627 and a lead amplifier 630.

The input terminal of the inverter 601 is connected to one terminal of a switch 621, and the output terminal thereof is connected to one terminal of a switch 622. The input terminal of the inverter 602 is connected to one terminal of the switch 622 and the output terminal thereof is connected to one terminal of the switch 621. The inverters 601, 602 are activated by an activating signal SAE.

The gate of the transistor 611 is connected to one terminal of a switch 624 and the drain of the transistor T1 is connected to earth. The source of the transistor 611 is connected to the lead amplifier 630 by means of a wire RDB. The gate of the transistor 612 is connected to one terminal of a switch 625 and the drain of the transistor 612 is connected to earth. The source of the transistor 612 is connected to the lead amplifier 630 by means of a wire RDBB.

One terminal of the switch 621 is connected to the input terminal of the inverter 601 and the output terminal of the inverter 602, and the other terminal of the switch 621 is connected to the bit line BL0. One terminal of the switch 622 is connected to the output terminal of the inverter 601 and the input terminal of the inverter 602, and the other terminal of the switch 622 is connected to the bit line BLB0. The opening and closing of the switches 621, 622 is controlled by the signal TG.

One terminal of the switch 623 is connected to the bit line BL0, and the other terminal of the switch 623 is connected to the bit line BLB0. The opening and closing of the switch 623 is controlled by the signal EQA.

One terminal of the switch 624 is connected to the gate of the transistor 611, and the other terminal of the switch 624 is connected to the input terminal of the inverter 601 and the output terminal of the inverter 602. One terminal of the switch 625 is connected to the gate of the transistor 612, and the other terminal of the switch 625 is connected to the output terminal of the inverter 601 and the input terminal of the inverter 602. The opening and closing of the switches 624, 625 is controlled by the signal RCL.

A bit line reference potential VBL is applied to one terminal of a switch 626, and the other terminal of the switch 626 is connected to the one terminal of the switch 621. Additionally, the bit line reference potential VBL is applied to one terminal of a switch 627, and the other terminal of the switch 627 is connected to the one terminal of the switch 622. The opening and closing of the switches 626, 627 is controlled by the signal EQSA.

The lead amplifier 630 externally outputs a current of a value corresponding to the drain current of the transistors 611, 612.

The operational principles of the correlation value calculating device relating to the present embodiment are described below.

The operation of writing template vector components to the memory cells is virtually the same as the case of the first embodiment.

The correlation value calculating device relating to the present embodiment performs a correlation value calculating operation and refreshing operation, as described below. FIG. 7 is a timing chart for describing these operations.

Before an input vector is read in, the signals EQA, TG, EQSA are high-level, and therefore, the switches 621, 622, 623, 626, 627 are closed. Thereby, the bit line BL0 and the bit line BLB0 are mutually connected, and a bit line reference potential VBL is applied to these bit lines BL0, BLB0. Moreover, before the input vector is read in, the signal RCL is low-level, and therefore the switches 624, 625 are opened. Accordingly, the bit line pair BL0, BLB0 are not connected to the transistors 611, 612. In addition, before the input vector is read in, the activating signal SAE is low-level and therefore the inverters 601 and 602 do not function.

The calculation of the correlation value starts at timing I. At timing I, the signal EQSA changes to low-level, and therefore, the switches 626 and 627 open. Thereby, the reference voltage VBL stops being applied to the bit line pair BL0 and BLB0. Furthermore, at timing I, the signal RCL assumes a high-level and therefore switches 624 and 625 close. Accordingly, the bit lines BL0, BLB0 are connected to the gates of the transistors 611, 612. Furthermore, at timing I, an input vector is read in. Thereby, the respective word lines WL0–WL7 are activated. FIG. 7 shows a case where the word line WL0 has assumed high-level and the word line WL1 has assumed low-level. When the word lines WL0–WL7 are activated, the electric potential of the bit line pair BL0, BLB0 changes to VBL +$\Delta$V, due to a similar principle as that in the first embodiment. In other words, the capacitors of the memory cells where the compared vector components are matching charge up the bit line pair BL0, BLB0, whilst the capacitors of the memory cells where the compared vector components are not matching take in electric charge from the bit line pair BL0, BLB0. At timing I, the switch 623 is closed, and hence the bit line pair BL0, BLB0 have the same electric potential. When the electric potential of the bit line pair BL0, BLB0 changes from BL to VBL+$\Delta$V, the drain current of the transistors 611, 612 also changes. The lead amplifier 630 outputs a signal having a value corresponding to these drain currents, as a correlation value calculation result.

The correlation value calculation operation terminates at timing II. At timing II, the signal EQSA reverts to high-level, and hence the switches 626, 627 close, and the electric potential of the bit line pair BL0, BLB0 reverts to the reference electric potential VBL. Furthermore, the signal RCL returns to low-level, and hence the switches 624, 625 open. Additionally, at timing II, the word lines WL0–WL7 revert to an non-active state.

At timing III, a refresh operation of the memory cells is initiated. At timing III, firstly, the signals EQA, TG, EQSA are set to low-level. This opens the switches 621, 622, 623, 626, 627, and therefore the bit lines BL0, BLB0 respectively assume a floating state. At this stage, the bit line BL0 and the bit line BLB0 respectively have an electric potential of VBL. Next, the word line of word line WL0 or word line WL1 which was set to low-level during correlation value calculation is set to high-level. Thereby, the memory cell capacitance which was not discharged or charged during the correlation value calculation is connected to one of the two corresponding bit lines, in other words, the bit line pair. In the example in FIG. 7, each of the memory cells connected to the word line WL1 is connected to a corresponding bit line BLB0, BLB1, . . . The capacitors thereof either provide charge to, or remove charge from, the corresponding bit line. Thereby, the electric potential of each of the corresponding bit lines is caused to change. For example, when a bit line is connected to a capacitor into which Vss has been written, the electric potential of this bit line drops below VBL. On the other hand, if a bit line is connected to a capacitor into which Vdd has been written, then the electric potential of this bit line rises above VBL. In the example in FIG. 7, the electric potential of the bit line BLB0 is less than VBL. Here, the electric potentials of the other bit lines, BL0, BL1, . . . , are maintained at VBL.

At timing IV, the signals TG, SAE are set to high-level. This closes the switches 621, 622, and activates the inverters 601, 602. As stated previously, in the example in FIG. 7, the electric potential of the bit line BLB0 is less than VBL. In this case, the inverter 602 outputs a high-level. Thereby, the electric potential of the bit line BL0 is raised to Vdd. Due to this rise in the electric potential of the bit line BL0, the inverter 601 outputs a low-level. Thereby, the electric potential of the bit line BLB0 drops to Vss.

At timing V, the electric potential of the word lines WL0, WL1 is set to high-level. Thereby, the electric potentials of the corresponding bit lines are respectively written to the memory cell capacitors connected to word lines WL0 and WL1. The electric potentials written to each capacitor at timing V are equal to the stored electric potentials before correlation value calculation are performed.

At timing VI, the refresh operation is terminated. At timing VI, the electric potentials of the word lines WL0, WL1 are returned to low-level, the signals EQA, TG, EQSA revert to high-level, and the signals SAE, RCL revert to low-level. Thereby, the electric potentials of the bit line pair BL0, BLB0 are returned to VBL.

Thereupon, a similar refresh operation is executed, in successive fashion, for the memory cells connected to word lines WL2, WL3, the memory cells connected to word lines WL4, WL5, and the memory cells connected to word lines WL6, WL7.

As described above, according to the present embodiment, it is possible to perform a refresh operation for a memory cell array by means of simple circuitry.

In addition, the correlation value calculating device relating to the present embodiment has similar advantages to those of the correlation value calculating device relating to the first embodiment.

Third Embodiment

Below, a correlation value calculating device relating to a third embodiment of the present invention is described with reference to FIG. 8 and FIG. 9. The correlation value calculating device relating to the present embodiment uses vectors consisting of components having four types of value. The correlation value calculating device according to the present embodiment calculates weighted correlation values from vectors of this kind.

Similarly to the first embodiment, the correlation value calculating device relating to the present embodiment comprises a memory cell array, a word line driver, a sense amplifier, word lines and bit lines.

Figure 8:
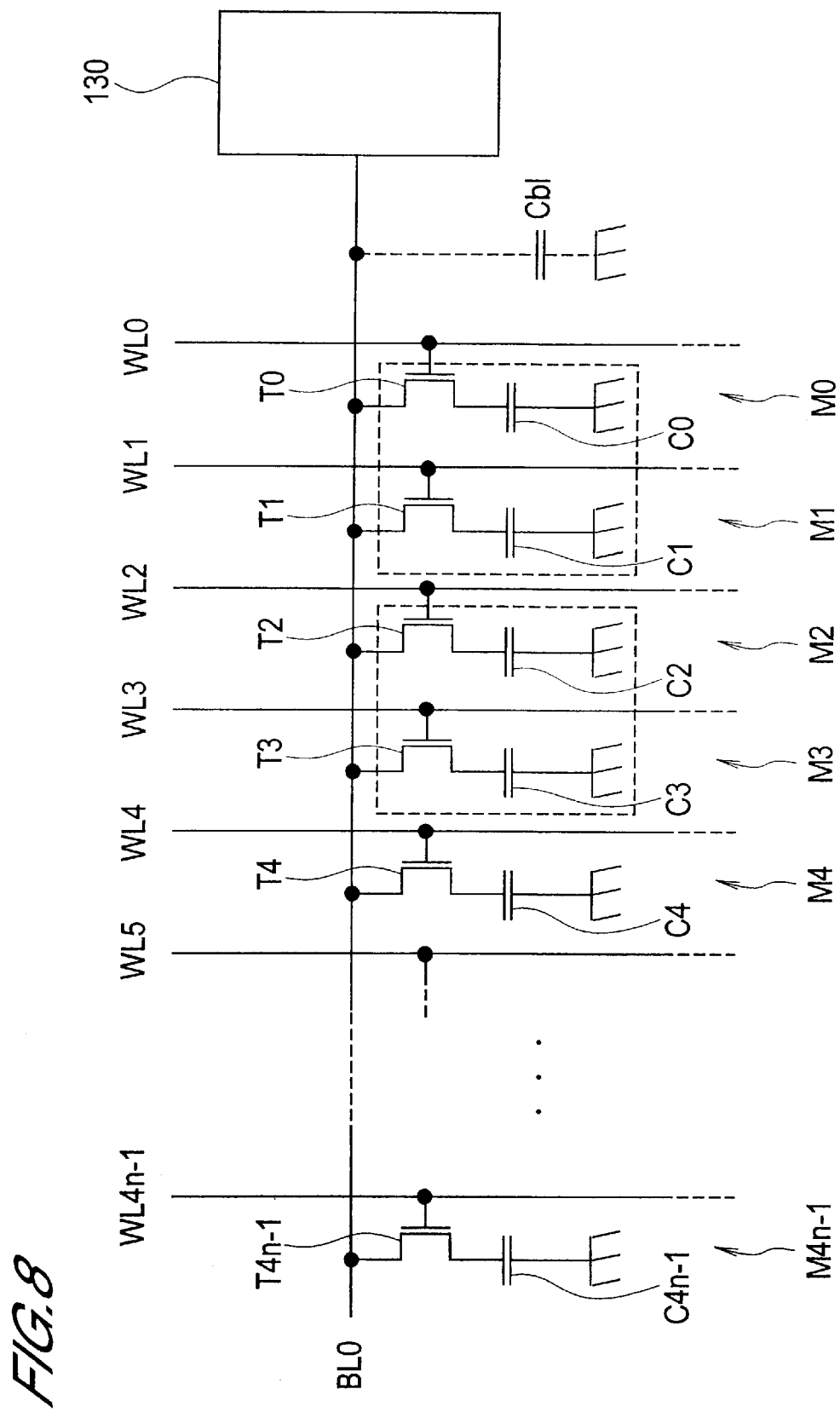
FIG. 8 is a circuit diagram giving a partial illustration of the internal structure of a memory cell array provided in a correlation value calculating device relating to a third embodiment.

FIG. 8 is a conceptual diagram showing the principal composition of a correlation value calculating device relating to the present embodiment. FIG. 8 only depicts the structure corresponding to one template vector TV0, but the structure corresponding to the other template vectors is similar to this structure. In FIG. 8, constituent elements having similar labels to FIG. 3 indicate the same elements as in FIG. 3.

As shown in FIG. 8, the correlation value calculating device relating to the present embodiment comprises four memory cells M0, M1, . . . , M4n−1, (where n is a natural number), for each row, in other words, for each bit line. Memory cells connected to the same bit line are used for storing a single template vector. Each memory cell M0–M4n−1 respectively comprises one transistor and one capacitor. The gates of the transistors T0, T1, . . . , T4n−1, are connected respectively to corresponding word lines WL0, WL1, . . . , WL4n−1, and the sources thereof are connected respectively corresponding bit lines. The drains of the transistors T0, T1, . . . , T4n−1 are connected to one terminal of corresponding capacitors. The other terminal of these capacitors C0, C1, . . . , C4n−1, is connected to earth.

Each vector component of the template vectors is stored using four memory cells. For example, the memory cells M0, M1, M2, M3 are used for storing one vector component. Each vector component is constituted by an upper bit and a lower bit. Each bit is stored respectively by using two memory cells. For example, the memory cells M0, M1 are used to store the lower bit and the memory cells M2, M3 are used to store the upper bit. Similarly to the case of the first embodiment, either +1 or −1 is written to each bit. For example, Vdd is written the memory cells M0, M3, and Vss is written to memory cells M1 and M2. In other words, the memory cell pair M2, M3 store '−1' as the upper bit, whilst the memory cell pair M0, M1 store '+1' as the lower bit. Therefore, the value of this vector component is (−1, +1).

In the correlation value calculating device relating to the present embodiment, the capacitance of the capacitors used for lower bits is Ccell, and the capacitance of the capacitors used for upper bits is 2Ccell. In other words, the capacitance of the upper bit capacitors is set to twice the capacitance of the lower bit capacitors. Thereby, the correlation value calculating device relating to the present embodiment is capable of calculating weighted correlation values (described hereinafter).

The method for writing template vector component to the memory cells M0–M4n−1 is similar to that used in the correlation value calculating device relating to the first embodiment.

When calculating correlation values for a template vector TV0 and an input vector IV, firstly, the electric potential of the bit line BL0 is set to Vdd/2, by pre-charging the bit line BL0. Thereupon, a word line driver (not illustrated) obtains an input vector from an external source. The word line driver activates the word lines W0, W1, . . . , W4n−1, on the basis of the value of each component of the input vector. For example, if the value of the input vector component corresponding to the word lines W0–W3 is (+1, +1), then the word lines WL0 and WL2 are set to high-level, whilst the word lines WL1 and WL3 are set to low-level. Thereby, the transistors T0 and T2 are switched on, whilst the transistors T1 and T3 are maintained in an off state. In the example, Vdd is written to the capacitor C0, and Vss is written to the capacitor C2. In this case, the capacitor C0 supplies electric charge to the bit line BL0, and the capacitor C2 takes in electric charge from the bit line BL0. This causes the electric potential of the bit line BL0 to change. The other capacitors C1, C3 do not affect the electric potential change in bit line BL0, since the transistors T1 and T3 are switched off.

As described above, the capacitance of the capacitors C0, C1 used for the lower bits is Ccell, and the capacitance of the capacitors C2, C3 used for the upper bits is 2Ccell. Furthermore, the sum total of the electric charge within the memory array is the same, before and after calculation. Therefore, taking the number of components in the template vector and the input vector as m, the matching number of upper bits as k1, the matching number of lower bits as k2, and the electric potential of the bit line BL0 after correlation value calculation as V, the following equation (11) is established.

$$Cbl \frac{Vdd}{2} + k1 \cdot 2Ccell \cdot Vdd + k2 \cdot Ccell \cdot Vdd = (Cbl + 3mCcell)V \quad (11)$$

By rearranging equation (11), the following equation (12) is obtained.

$$V = \frac{Vdd}{2} + (2(2k1 + k2) - 3m) \frac{Ccell}{Cbl + 3mCcell} \frac{Vdd}{2} \quad (12)$$

From equation (12), it can be seen that the electric potential of the bit line BL0, namely, the correlation value, increases in direct proportion to 2k1+k2. In other words, the correlation value calculating device relating to the present embodiment is able to calculate a weighted correlation value.

Figure 9:
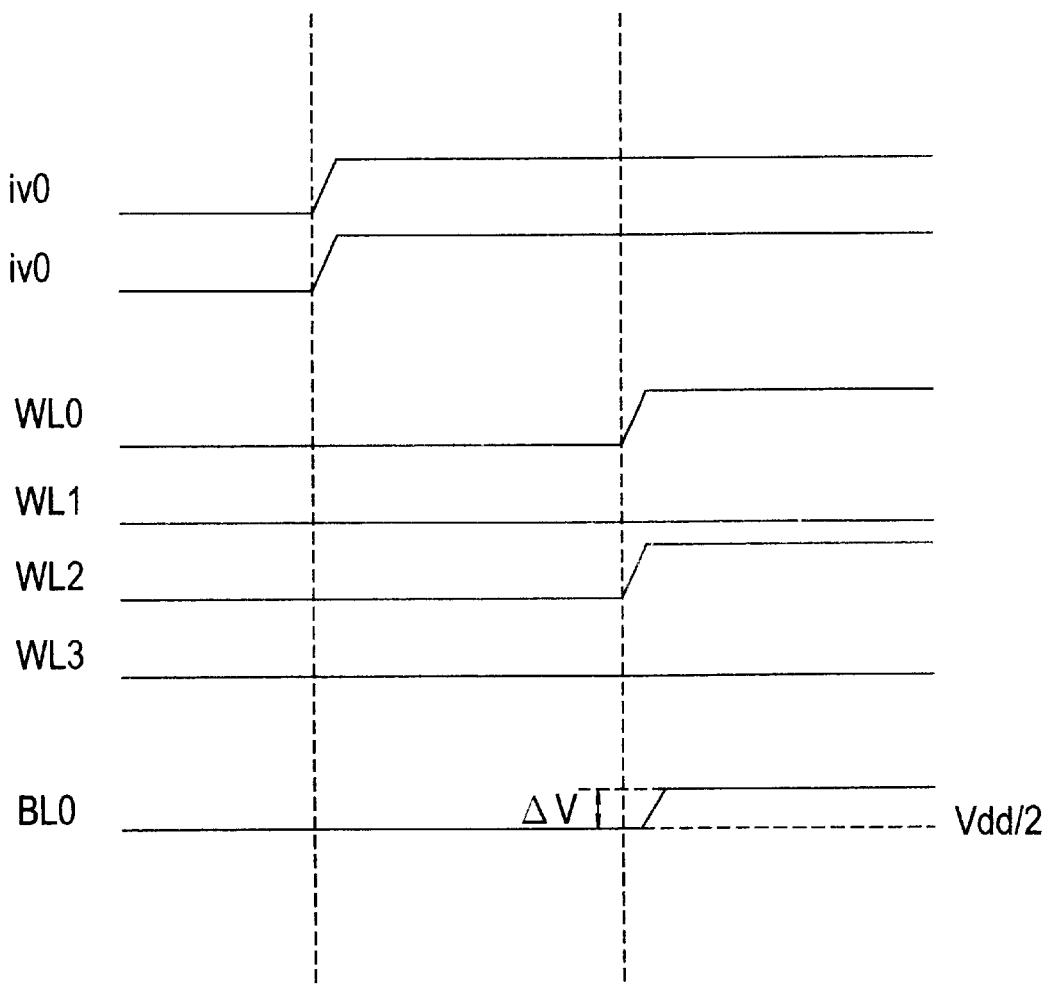
FIG. 9 is a timing chart for describing the operation of a correlation value calculating device relating to a third embodiment.

FIG. 9 is a timing chart showing the operational timing of a correlation value calculating device relating to the present embodiment.

Firstly, the component iv0, iv1, . . . of an input vector IV are input to a word line driver. The word line driver decodes the values of the respective components iv0, iv1, . . . , and activates the word lines WL0, WL1, . . . , according to the results of the decode operation. Furthermore, simultaneously with activating the word lines WL0, WL1, . . . , a voltage of Vdd/2 is applied to the bit lines BL0, BL1, . . .

Each memory cell, M0, M1, . . . either supplies electric charge to the bit line, or takes in electric charge from the bit line, as described above. Thereby, The electric potential of the bit line is caused to change. The example in FIG. 9 illustrates a case where the bit line BL0 has risen by ΔV.

The electric potential of the bit line is output to the sense amplifier.

As described in the foregoing, the correlation value calculating device relating to the present embodiment is capable of calculating weighted correlation values.

The present embodiment was described using the example of a device for performing correlation value calculation for vectors wherein each vector component comprises 2 bits. However, it is also possible to apply the present invention to a correlation value calculating device wherein each vector component has 3 or more bits.

Furthermore, the correlation value calculating device relating to the present embodiment has the same merits as the correlation value calculating device relating to the first embodiment.

Fourth Embodiment

Below, a correlation value calculating device relating to a fourth embodiment of the present invention is described with reference to FIG. 8 and FIG. 9. Similarly to the third embodiment, the correlation value calculating device relating to the present embodiment uses vectors consisting of components having four types of value, in other words, components having two bits. The present embodiment provides technology for reducing the size of the circuitry of a correlation value calculating device using vectors consisting of components having a plurality of bits.

Figure 10:
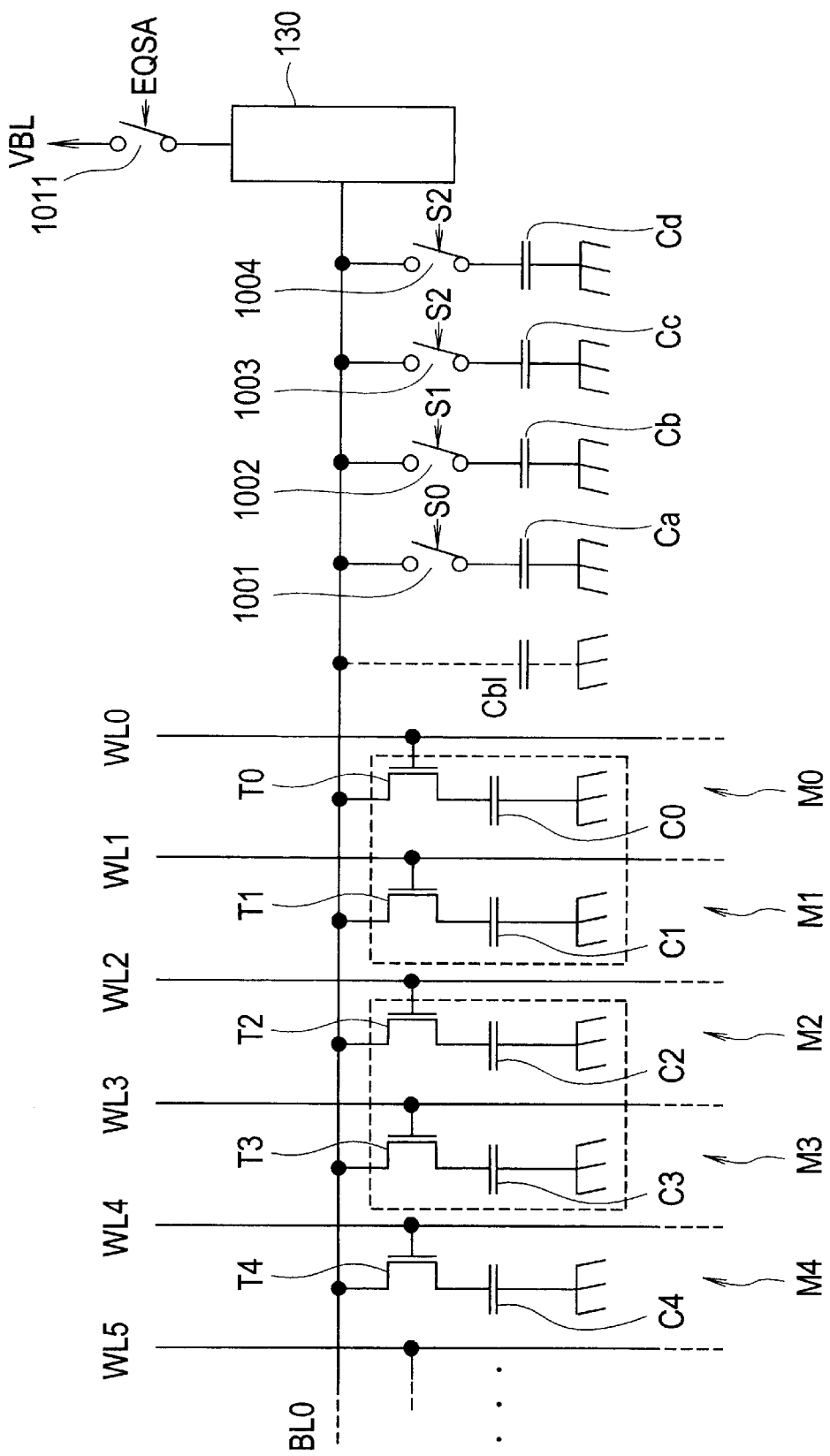
FIG. 10 is a circuit diagram giving a partial illustration of the internal structure of a memory cell array provided in a correlation value calculating device relating to a fourth embodiment.

FIG. 10 is a conceptual diagram showing the principal composition of a correlation value calculating device relating to the present embodiment. FIG. 10 only depicts the structure corresponding to one template vector TV0, but the structures corresponding to the other template vectors TV1–TV7 are similar to this structure. In FIG. 10, the constituent elements having similar labels to FIG. 3 indicate the same elements as in FIG. 3.

Similarly to the correlation value calculating device relating to the third embodiment, the correlation value calculating device relating to the present embodiment comprises 4n memory cells M0, M1, . . . , M4n −1, (where n is a natural number), for each row, in other words, for each bit line. Memory cells connected to the same bit line are used for storing a single template vector. Each memory cell M0–M4n−1 respectively comprises one transistor and one'capacitor. The gates of the transistors T0, T1, . . . , T4n −1, are connected respectively to corresponding word lines WL0, WL1, . . . , WL4n−1, and the sources thereof are connected respectively corresponding bit lines. The drains of the transistors T0, T1, . . . , T4n−1 are connected to one terminal of corresponding capacitors. The other terminal of these capacitors C0, C1, . . . , C4n−1, is connected to earth. Similarly to the third embodiment, each vector component of the template vectors is stored using four memory cells.

In the correlation value calculating device according to the present embodiment, the capacitors C0, C1, . . . , C4n−1, all have the same capacitance. In other words, in the correlation value calculating device according to the present embodiment, the capacitors used for upper bits and the capacitors used for lower bits have the same capacitance. In the following description, the capacitance of the capacitors C0, C1, ..., C4n−1, is defined as Ccell.

Furthermore, the correlation value calculating device relating to the present embodiment comprises four capacitors Ca, Cb, Cc, Cd, for storing calculation results. As shown in FIG. 10, one terminal of each capacitor Ca, Cb, Cc, Cd, is connected via a corresponding switch 1001, 1002, 1003, 1004, to the bit line BL0. The other terminal of each capacitor Ca, Cb, Cc, Cd is connected to earth. The opening and closing of the switch 1001 is controlled by the signal S0, the opening and closing of the switch 1002 is controlled by the signal S1, and the opening and closing of the switches 1003 and 1004 is controlled by the signal S2.

The sense amplifier 130 inputs a bit line reference potential VBL by means of the switch 1011. This potential VBL is used for pre-charging the respective bit lines. The opening and closing of the switch 1011 is controlled by the signal EQSA.

In the correlation value calculating device according to the present embodiment, the principle used for storing the template vector components in the memory cell array is the same as that used in the third embodiment. In other words, each template vector component is stored using four memory cells. Each vector component is constituted by an upper bit and a lower bit, and each bit is stored respectively by using two memory cells. Similarly to the case of the aforementioned embodiments, either '+1' or '−1' is written to each bit. for example, Vdd is written to the memory cells M0, M3, and Vss is written to the memory cells M1, M2. In other words, the memory cell pair M2, M3 stores '−1' as an upper bit and the memory cell pair M0, M1 stores '+1' as a lower bit. Therefore, the value of the vector component is (−1,+1). The procedure for writing Vdd or Vss to the respective memory cells is the same as that used in the foregoing embodiments.

Figure 11:
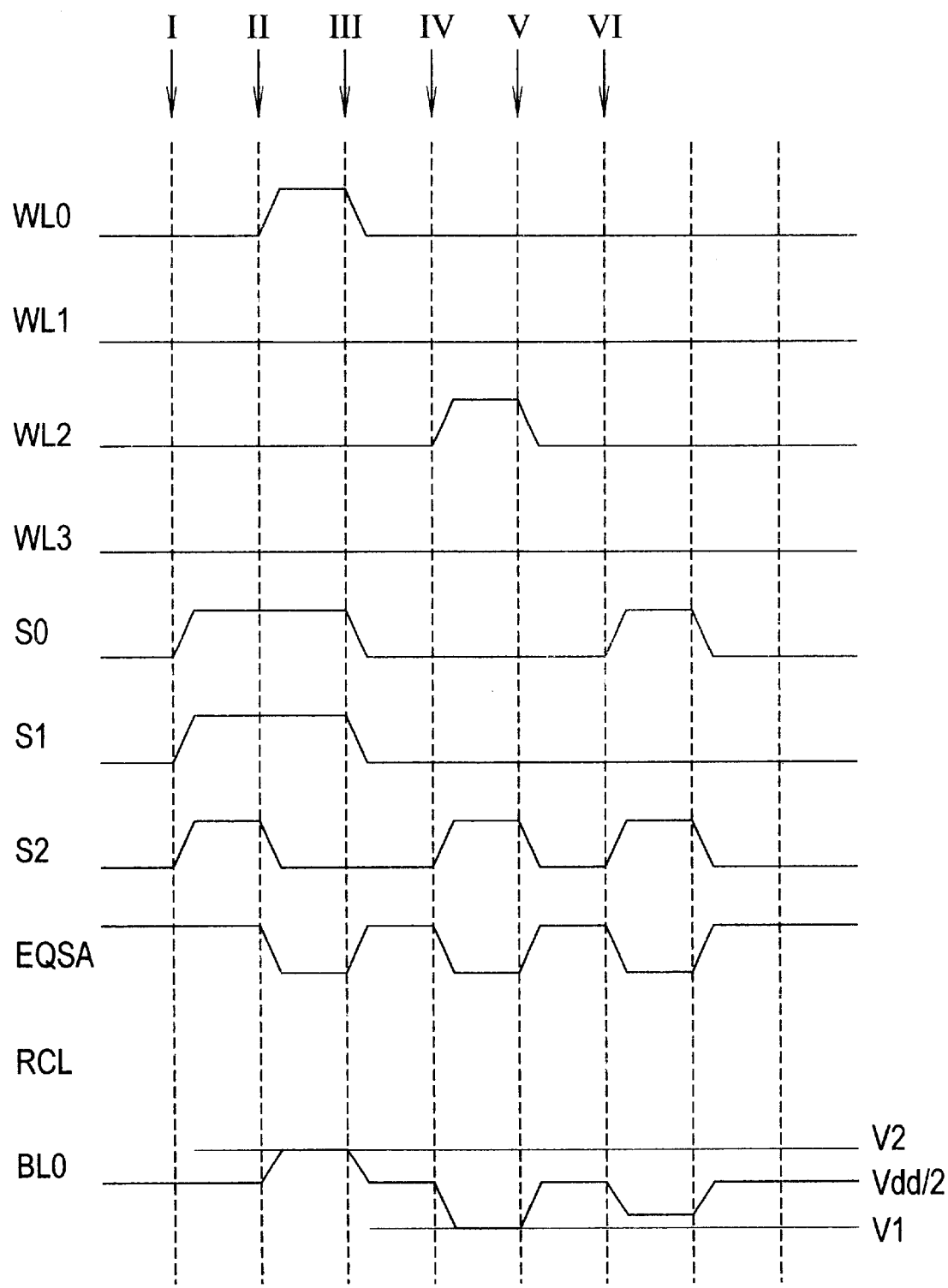
FIG. 11 is a timing chart for describing the operation of a correlation value calculating device relating to a fourth embodiment.

FIG. 11 is a timing chart for describing the calculation procedure implemented by the correlation value calculating device relating to the present embodiment.

Before the start of calculation, the signals S0, S1, S2 are low-level. Therefore, the switches 1001–1004 are open. Moreover, before the start of calculation, the signal EQSA is high-level. Therefore, the switch 1011 is closed, and hence the electric potential of the bit line BL0 is VBL.

At timing I, the signals S0, S1, S2 change to high-level. This causes the switches 1001–1004 to close, and hence the capacitors Ca, Cb, Cc, Cd are charged. Due to this charging, the terminal-to-terminal voltage of the capacitors Ca, Cb, Cc, Cd becomes Vdd/2.

At timing II, the signals S2 and EQSA change to low-level. This causes the switches 1003, 1004 and 1011 to open. Therefore, the capacitors Cc and Cd are disconnected from the bit line BL0, and pre-charging of the bit line BL0 is terminated. Moreover, at timing II, the respective word lines, WL0, WL1, WL4, WL5, ... corresponding to the lower bits are activated in accordance with the values of the input vector components. In the example in FIG. 11, the word lien WL0 is set to high-level, and the word line WL1 is set to low-level. Consequently, the transistor T0 is switched on and hence the electric charge accumulated in capacitor C0 increases the electric potential of the bit line BL0 to V2. Since the switches 1101, 1102 are closed at this time, the electric potential of the capacitors Ca and Cb is also raised to V2. On the other hand, the switches 1003 and 1004 are open, and therefore the electric potential of the capacitors Cc and Cd does not change. The total sums of electric potential are the same before and after the lower bit calculation. Accordingly, taking the number of vector component as j and the matching number of lower bit as k2, the following expression (13) is established.

$$Cbl\frac{Vdd}{2} + k2 \cdot Ccel \cdot Vdd + 2 \cdot Ccell \cdot Vdd = (Cbl + (j+2)Ccell)V2 \quad (13)$$

By rearranging equation (13), the following expression (14) is obtained.

$$V2 = \frac{Vdd}{2} + (2k2 - j)\frac{Ccell}{Cbl + (j+2)Ccell} \cdot \frac{Vdd}{2} \quad (14)$$

At timing III, the respective word lines corresponding to the lower bits are returned to low-level. Moreover, the signals S0, S1 are set to low-level and therefore, the switches 1001 and 1002 open. Also, the signal EQSA is set to high-level, whereby the switch 1011 is closed, and hence the electric potential of the bit line BL0 returns again to Vdd/2.

At timing IV, the signal S2 is set to high-level, and hence the switches 1003 and 1004 are closed. This means that the capacitors Cc and Cd are connected to the bit line BL0. Furthermore, since the signal EQSA is at low-level, the switch 1011 opens. Additionally, at timing IV, the respective word lines WL2, WL3, WL6, WL7, ... corresponding to the upper bits are activated in accordance with the values of the input vector components. In the example in FIG. 11, the word line WL2 is set to high-level, and the word line WL3 is set to low-level. Thereby, the transistor T2 is switched on and hence the capacitor C2 causes the bit line BL0 to assume an electric potential of V1. Since the switches 1103 and 1104 are closed at this time, the electric potential of capacitors Cc and Cd also becomes V1. On the other hand, the switches 1001 and 1002 are open, and hence the electric potential of capacitors Ca and Cb does not change. The sum total of the electric charge before and after upper bit calculation is the same. Therefore, taking the number of vector components as j and the matching number of upper bits as k1, the following expression (15) is established.

$$Cbl\frac{Vdd}{2} + k1 \cdot Ccell \cdot Vdd + Ccell \cdot Vdd = (Cbl + (j+2)Ccell)V1 \quad (15)$$

By rearranging equation (15), the following expression (16) is obtained.

$$V1 = \frac{Vdd}{2} + (2k1 - j)\frac{Ccell}{Cbl + (j+2)Ccell} \cdot \frac{Vdd}{2} \quad (16)$$

At timing V, the word lines WL2, WL3 are set to low-level and therefore, the transistor T2 turns off. Moreover, the signal S2 is set to low-level. which causes the switches 1003 and 1004 to open. Furthermore, the signal EQSA is set to high-level, whereby the switch 1011 closes, and hence the electric potential of the bit line BL0 returns again to Vdd/2.

At timing VI, the signal EQSA is set to low-level and therefore the switch 1011 opens. Furthermore, at timing VI, the signals S0, S2 change to high-level, whereby the switches 1001, 1003 and 1004 are caused to close. Switch 1002 is not closed at timing VI. Consequently, there is a redistribution of electric charge between the capacitors Ca, Cc, Cd and the bit line BL0. The sum total of the electric charge is the same before and after redistribution. Therefore, taking the electric potential of the bit line BL0 before and after redistribution as V, the following expression (17) is established.

$$2CcellV1 + CcellV2 = (Cbl + 3Ccell)V \quad (17)$$

By rearranging equation (17), the following expression (18) is obtained.

$$V = \frac{Vdd}{2} + (2k1 + k2 - j)\frac{2(Ccell)^2}{(Cbl+Ccell)(Cbl+(j+2)Ccell)}\frac{Vdd}{2} \quad (18)$$

From equation (18), it can be seen that the electric potential of the bit line BL0, namely, the correlation value, increases in proportion to 2k1+k2. In other words, the correlation value calculating device relating to the present embodiment is capable of calculating weighted correlation values.

Thereupon, the signals S0, S2 return to low-level and the signal EQSA returns to high-level. Thereby, the switches 1001, 1003, 1004 are opened and the electric potential of the bit line BL0 becomes Vdd/2.

As described in the foregoing, according to the correlation value calculating device relating to the present embodiment, it is possible to perform weighted correlation value calculation, without using high capacitance capacitors as the memory cell capacitors C2, C3, C6, C7, . . . corresponding to the upper bit. Therefore, according to the correlation value calculating device relating to the present embodiment, if the number of components in each vector is three or more, then the circuit surface area for forming capacitors can be reduced in comparison with the correlation value calculating device according to the third embodiment.

What is claimed is:

1. A correlation value calculating device comprising:

one or a plurality of bit lines;

a plurality of word lines disposed in such a manner that they intersect with said bit lines;

a plurality of memory cells disposed at the intersection points of said bit lines and said word lines, respectively comprising a capacitor for storing a binary value according to the terminal-to-terminal voltage thereof, and a transistor for controlling connection and disconnection between one terminal of said capacitor and said bit line, in accordance with the electric potential of said word line;

a word line driver for inputting an input vector component to each word line pair constituted by two adjacently positioned word lines, applying a high-level electric potential to the one word line and applying a low-level electric potential to the other word line, if said component is a first value, or applying a low-level electric potential to the one word line and applying a high-level electric potential to the other word line, if said component is a second value; and a sense amplifier for amplifying and outputting the electric potential of said bit lines.

2. The correlation value calculating device according to claim 1, wherein said memory cells are disposed at every intersection point of said bit lines and said word lines.

3. The correlation value calculating device according to claim 2, comprising means for writing template vector components, for each memory cell pair constituted by two memory cells connected to the same bit line and connected to the same word line pair.

4. The correlation value calculating device according to claim 3, wherein said writing means writes a high-level electric potential to said capacitor of one of said memory cells and writes a low-level electric potential to said capacitor of the other of said memory cells, if said template vector component is a first value, and writes a low-level electric potential to said capacitor of the one of said memory cells and writes a high-level electric potential to said capacitor of the other of said memory cells, if said template vector component is a second value.

5. The correlation value calculating device according to claim 2, comprising means for pre-charging said bit lines to an electric potential which is lower than said high-level electric potential and higher than said low-level electric potential.

6. The correlation value calculating device according to claim 5, comprising control means having:

means for causing said pre-charging means to pre-charge said bit lines;

means for causing said word line driver to apply a voltage to said word lines, after said pre-charging; and means for causing said sense amplifier to amplify and output the electric potential of said bit lines, after said voltage has been applied.

7. The correlation value calculating device according to claim 1, wherein said memory cells are disposed at the intersection points of one bit line of each bit line pair consisting of two adjacently positioned bit lines with the one word line of each of said word line pairs, and at the intersection points of the other bit line of each of said bit line pairs with the other word line of each of said word line pairs.

8. The correlation value calculating device according to claim 7, comprising refreshing means having:

a first switch for switching between connection and disconnection of the two bit lines of said bit line pairs;

a second switch for switching between connection and disconnection of said bit line pairs and said sense amplifier; and a differential amplifier for raising the electric potential of the higher electric potential bit line of a bit line pair, to the high-level, and reducing the electric potential of the lower electric potential bit line of a bit line pair, to the low-level.

9. The correlation value calculating device according to claim 8, wherein said differential amplifier comprises:

a first inverter, the input terminal of which is connected to one bit line of a bit line pair, via a third switch, and the output terminal of which is connected to the other bit line of a bit line pair, via a fourth switch; and a second inverter, the output terminal of which is connected to said one bit line via the third switch, and the input terminal of which is connected to said other bit line via the fourth switch.

10. The correlation value calculating device according to claim 8, comprising means for pre-charging said bit lines to an electric potential which is lower than said high-level electric potential and higher than said low-level electric potential.

11. The correlation value calculating device according to claim 10, comprising control means having:

means for causing said pre-charging means to pre-charge said bit lines;

means for causing said word line driver to apply a voltage to said word lines, after said pre-charging; and means for causing said sense amplifier to amplify and output the electric potential of said bit lines, after said voltage has been applied.

12. The correlation value calculating device according to claim 10, comprising control means having:

means for causing said pre-charging means to pre-charge said bit lines;

means for causing said word line driver to apply an electric potential to one word line pair which is inverse to the electric potential during read out, after said pre-charging;

means for causing said differential amplifier to be activated, after said voltage has been applied; and means for writing the electric potential of said bit line to a memory cell pair corresponding to said word line pair, after said activation.

13. The correlation value calculating device according to claim 7, comprising means for writing template vector components to each memory cell pair constituted by two of said memory cells connected to the same bit line pair and connected to the same word line pair.

14. The correlation value calculating device according to claim 13, wherein said writing means writes a high-level electric potential to said capacitor of one of said memory cells and writes a low-level electric potential to said capacitor of the other of said memory cells, if said template vector component is a first value, and writes a low-level electric potential to said capacitor of the one of said memory cells and writes a high-level electric potential to said capacitor of the other of said memory cells, if said template vector component is a second value.

15. The correlation value calculating device according to claim 1, comprising several memory cell pairs corresponding to one template vector components, wherein the capacitance of the capacitors vary for each memory cell pair.

16. The correlation value calculating device according to claim 15, wherein a upper bit memory cell pair and a lower bit memory cell pair are comprised corresponding to one template vector, the capacitance of capacitors belonging to said upper bit memory cell pair are a prescribed number of factors greater than the capacitance of capacitors belonging to said lower bit memory pair.

17. The correlation value calculating device according to claim 1, further comprising:

weighting capacitors used for temporarily storing the electric charge read out from said bit lines, provided in single or plural fashion for each dimension of the template vector components; and weighting switches for controlling connection and disconnection of said weighted capacitors and said bit lines.

18. The correlation value calculating device according to claim 17, comprising:

means for controlling said weighting switches in such a manner that, when a value is read out to said bit line from said memory cell corresponding to any one of the dimensions, then all of said weighting capacitors corresponding to that dimension are connected to said bit line; and means for controlling said weighting switches in such a manner that, when a correlation value is supplied to said sense amplifier, a number of said weighting capacitors corresponding to a weighting is connected to said bit line.

19. The correlation value calculating device according to claim 17, wherein said weighting capacitors comprise an even number of capacitors for lower bits and an even number of capacitors for upper bits.

20. The correlation value calculating device according to claim 19, comprising:

means for controlling said weighting switches in such a manner that, when a value is read out to said bit line from a memory cell corresponding to a lower bit, all of said lower-bit capacitors are connected to said bit line;

means for controlling said weighting switches in such a manner that, when a value is read out to said bit line from a memory cell corresponding to an upper bit, all of said upper-bit capacitors are connected to said bit line; and means for controlling said weighting switches in such a manner that, when a correlation value is supplied to said sense amplifier, half of said lower-bit capacitors and all of said upper-bit capacitors are connected to said bit lines.

* * * * *